United States Patent Office 3,544,518
Patented Dec. 1, 1970

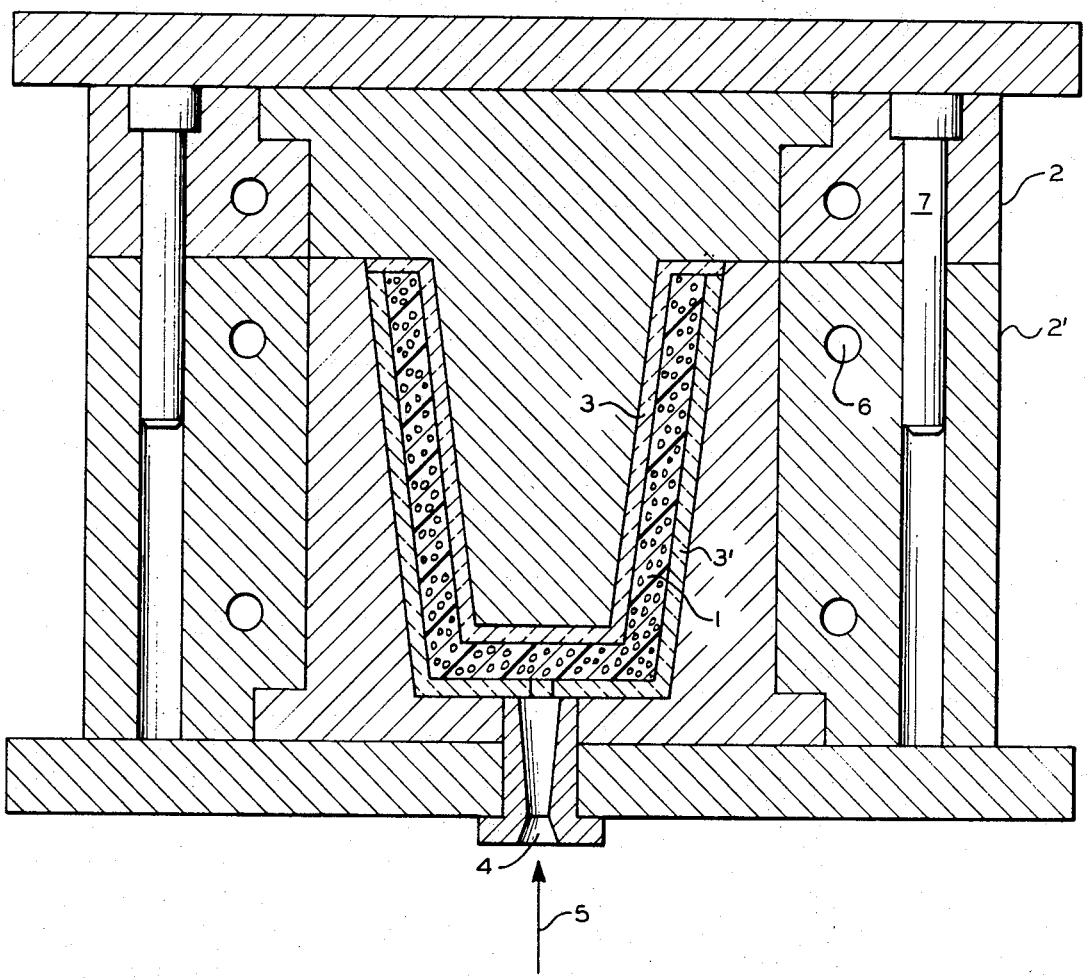

3,544,518
PRODUCTION OF FOAMED 1-OLEFIN POLYMER ARTICLES USING AN INSULATED MOLD
Roy L. Bodkins and Donald G. Needham, Bartlesville, Okla., assignors to Phillips Petroleum Company, a corporation of Delaware
Filed Jan. 22, 1968, Ser. No. 699,518
Int. Cl. B29d 23/02, 27/00
U.S. Cl. 264—48                                      4 Claims

ABSTRACT OF THE DISCLOSURE

Molded articles of 1-olefin polymers having a glossy or shiny surface are produced by means of a mold, the bulk of which is made of a material having a relatively high thermal conductivity value and which is kept at a relatively low temperature, the mold having an insulating lining of material which has a low thermal conductivity so that the polymer on introduction into the mold will not be chilled on initial contact with the mold.

---

This invention relates to a new and improved method of molding polymers. This invention also relates to a new and improved method for forming polymeric articles which have a smooth, glossy surface.

Heretofore, it has been thought that when injection molding foamable compositions of polymers of mono-1-olefins (1-olefins) it was necessary to use high mold temperatures, i.e., at least 265° F., in order to produce a part which had a smooth, glazed (glossy or shiny) surface. Mold temperatures lower than 265° F. were found to tend to produce a rough or grainy surface somewhat in appearance to that of wood. It is advantageous to use low mold temperatures, e.g., around 50° F., because the low temperatures decrease the time needed for the heated polymer to cool below its softening point and thereby harden. Therefore, these low temperatures substantially shorten the cycle time for molding operations which in turn provides increased production over previously known methods that use higher molding temperatures.

According to this invention, foamed, molded polymeric articles which have smooth, glossy (shiny) surfaces as opposed to rough and grainy surfaces are formed using low molding temperatures by employing a thermal conducting metal mold which is lined on the molding surfaces, i.e., those surfaces which are to contact the polymer, with a material which is thermal insulating relative to said mold.

By this invention, foamable polymers of 1-olefins are molded into foamed parts which have a smooth and glossy, rather than a rough and grainy, surface, and this is accomplished using low molding temperatures. Heretofore, such a combination of surface appearance and low molding temperatures was not thought possible.

The process of this invention produces useful products such as tumblers, wastepaper baskets, and the like.

Accordingly, it is an object of this invention to provide a new and improved molding process.

It is another object of this invention to provide a new and improved method for making foamed polymeric articles having smooth, glossy surfaces.

It is another object of this invention to provide a new and improved method for forming foamed and molded polymeric articles using relatively low molding temperatures.

Other aspects, objects, and the several advantages of this invention will become apparent to one skilled in the art from a study of the disclosure, drawing, and appended claims.

According to this invention, the foamable polymer to be foamed and molded, is heated to a temperature which is at least the softening point of the polymer composition and which is sufficiently elevated to cause foaming of the polymer composition at the pressure which is maintained in the mold in which the polymer is to be molded. The heated polymer to be molded is maintained under an elevated pressure which is sufficient to prevent substantial foaming of the heated polymer, this elevated pressure varying widely, but generally being at least 100 p.s.i.a. At the same time, the mold is maintained at a pressure sufficiently less than the elevated pressure maintained on the heated polymer so that foaming of the polymer occurs when the polymer is injected into the mold. For example, the mold can be at substantially atmospheric pressure so that when the polymer is injected into the mold the polymer is reduced from a pressure of at least 100 p.s.i.a. to substantially atmospheric pressure, thereby allowing foaming of the polymer as it is injected into and molded in the mold.

The polymer is allowed to cool in the mold at least to its softening point and thereafter a foamed, molded article having a smooth and glossy surface is removed from the mold.

Although it is not presently completely known to a certainty, and therefore it is not desired to be bound thereby, it appears that a smooth, glossy surface is obtained using an insulated cold mold because the insulated mold surface keeps the outer skin of the article from being rapidly cooled or otherwise quenched by the cold mold surface, and therefore the polymer forming this outer skin of the article retains its heat longer, thereby creating the effect of a hot mold surface for the instant wherein the mold is filled with polymer. Thereafter, because of the very cool nature of the more massive mold, the insulation and molded polymer are gradually cooled, but at a rate much greater than if the mold were maintained at temperatures of at least 265° F. In other words, the insulation in the mold has the initial effect of a hot mold when the skin of the article is being solidified, but this initial effect is overpowered by the more massive cold mold so that the remainder of the polymer in the mold is more rapidly cooled, thereby shortening the cycle time for the molding operation. This initial period of time when the insulation acts as a hot mold surface and the skin of the article is being formed is sufficient to give the article a smooth, glossy surface notwithstanding the fact that the mold was cold.

Thus, by applicants' invention, the advantages of using a hot mold, i.e., a smooth, glossy surface on the polymer article, and the advantages of using a cold mold, i.e., short cycle times for the molding operation, are both achieved.

The drawing shows an article produced by this invention. The article is a foamed tumbler 1 which was formed inside mold halves 2, 2', both mold halves being lined with insulating material 3, 3' so that polymer 1, when injected into the mold through orifice 4 and in the direction of arrow 5, contacted the insulation 3, 3' and remained in contact therewith during the foaming and molding process that followed.

Mold halves 2, 2' are cooled by way of channels 6 and are aligned for proper mating by way of pins 7. The polymer feed can be heated under pressure in a conventional extruder and then injected into the mold so that the pressure is not released from the heated polymer until that polymer is substantially in the mold and is in contact at least in part with the insulation in the mold.

The mold will be at a pressure of less than 100 p.s.i.a., preferably about atmospheric pressure, and will be any conventional mold known in the art which can be maintained at temperatures of less than 100° F., preferably from about 30 to about 65° F., by external cooling, e.g., by cooling water circulating in jackets around the mold. Thus, the temperature of the mold during the time in which the heated polymer is injected thereinto and cooled therein remains less than 100° F.

Generally, the results of this invention are obtained from polymers, homopolymers, copolymers, and mixtures thereof, formed from one or more 1-olefins having from 2–8 carbon atoms per molecule, inclusive. Examples of suitable monomers include ethylene, propylene, butene-1, octene, and the like. Preferred polymers are homopolymers of ethylene and propylene, and copolymers of two or more of ethylene, propylene, and butene-1.

The polymer is rendered foamable by incorporating therein any conventional foaming agent which will at least partially liberate a gaseous material when heated to a temperature in the range of from about 190 to about 700° F. Suitable foaming agents include N,N'-dinitrosopentamethylenetetramine, alkali metal carbonates such as sodium carbonate and sodium bicarbonate, ammonium carbonate, ammonium bicarbonate, azodicarbonamide, 4,4' - oxy - bis - (benzenesulfonyl hydrozide), azobisisobutyronitrile, benzene - 1,3 - disulfonylhydrozide, diazoaminobenzene, barium azodicarboxylate, and the like. The amount of foaming agent employed in the polymer can vary widely depending upon the polymer, the degree of foaming desired, the temperature of heating employed, and the like, but will generally be in the range of from about 0.1 to about 5 parts per 100 parts by weight of polymer. Of course, conventional temperature control agents for lowering or raising the temperature at which the foaming agent is activated to form the gaseous material, and dispersing agents such as mineral oil, dioctylphthalate, liquid polyisobutylene, and the like can be employed.

The polymer employed can also include conventional additives such as antioxidants or other stabilizers, pigments, plasticizers, antistatic agents, crosslinking agents, and the like.

The mold of this invention can be formed from any conventional metal molding material such as carbon steel and alloys thereof.

The insulating material used to line the metal molds of this invention can very widely in composition and thickness as employed in the mold. Suitable insulators include cork and cork products such as cork board; mineral wool; wood products such as fibers, boards, redwood bark, and the like; heat resistent plastics such as polyethylene terephthalate, polyphenylene sulfide, and the like; sandpaper; heat resistent organic paper (plain, crepe, corrugated, and the like); minerals such as magnesia, calcium silicate, perlite diatomite products, porous clay, and the like; vegetable fiber boards and cotton fibers when treated for heat resistence; asbestos (paper on mill board); glass; ceramics; rock wool; and the like. The thickness of the insulation employed in the mold will vary widely depending upon the particular insulation employed and the form of that insulation, e.g., fiber, board, and the like. Generally, the insulation will be from about 1 mil to about ½ inch in thickness.

Generally, the metal mold will have a thermal conductivity (K) of greater than 80, while the insulators used to line that mold will have a thermal conductivity of less than 50.

Thermal conductivity is defined as the time rate of heat transfer by conduction through unit thickness across unit area for unit temperature difference. Thermal conductivity as used herein has the units B.t.u.'s transferred per square foot per hour for a thickness of one inch and a difference temperature of 1° F. Thermal conductivity for this invention can be determined in accordance with ASTM C–177. Although thermal conductivity varies with temperature, the thermal conductivity values used for this invention are appropriate for an extreme temperature range of −50 to 1400° F. as set forth in ASTM procedure C–177. Generally, carbon steel and alloys thereof will have a K value of greater than 80. The K value for suitable insulators are, for example, less than 40 for glass, less than 1 for rock wool, less than 1 for cork and cork products, and so on.

The softening point of a polymer is determined for this invention in accordance with ASTM D–1525–58T. Representative softening point ranges are 180 to 230° F. for a homopolymer of ethylene having a density of less than 0.94 gram per cubic centimeter at 77° F., 250 to 260° F. for a homopolymer of ethylene having a density greater than 0.94 gram per cubic centimeter at 77° F., and 300 to 310° F. for a homopolymer of propylene.

EXAMPLE

A mold similar to that shown in the drawing and maintained substantially at 40° F. by circulating cool water through a jacket around the mold halves was used to form a tumbler similar in shape to that shown in the drawing and having an outer, smooth, glossy skin.

A copolymer of ethylene butene-1 was used, the copolymer having a melt index (flow) of 18 (ASTM D 1230–62T, Condition E). The copolymer contained 1 weight percent based on the total weight of the polymer of azodicarbonamide as the foaming agent. The copolymer was heated in an extruder to a temperature of about 450° F. under a pressure above 100 p.s.i.a.

The mold was formed from aluminum and lined with a film of polyethylene terephthalate, the thickness of the lining being 4 mils.

The mold was maintained at substantially atmospheric pressure.

The heated copolymer was extruded from the extruder into the mold and after 40 seconds, mold halves 2, 2' were separated and the molded tumbler removed therefrom. The thus-molded article was foamed substantinally throughout and had a smooth, glossy surface overall.

Reasonable variation and modification are possible within the scope of this disclosure without departing from the spirit and scope thereof.

We claim:

1. A method of making a foamed, molded article having at least in part a glossy surface comprising providing a thermal conducting metal mold cavity which is at least partly lined with a material which is thermal insulating relative to said mold, cooling said mold to a temperature less than 100° F., hetaing a heat foamable polymer formed from at least one 1-olefin having from 2–8 carbon atoms per molecular, inclusive, to a temperature which is at least the softening point of said polymer and which is sufficiently elevated to cause foaming of said polymer in said mold, maintaining said heated polymer under an elevated pressure which is sufficient to prevent substantial foaming of said polymer, the pressure in said mold being sufficiently less than the pressure on said heated polymer so that at least partial foaming of the polymer occurs when the polymer is injected into said mold, injecting said heated and pressurized polymer into said mold to cause foaming and molding of said polymer, and recovering from said mold a foamed, molded article having a glossy surface.

2. In a method according to claim 1 wherein said metal mold has a thermal conductivity of more than 80 B.t.u.'s per square foot per hour per ° F. per one inch thickness and said mold lining has a thermal conductivity of less than 50 B.t.u.'s per square foot per hour per ° F. per one inch thickness, thermal conductivities being determined in accordance with ASTM C–177.

3. The method according to claim 1 wherein said foamable polymer is formed from at least one of ethylene, propylene, and butene-1, said mold is at a temperature of from about 30 to about 65° F., said mold is at substantially atmospheric pressure, and said polymer is heated to a temperature of from about 190 to about 700° F. under a pressure of at least 100 p.s.i.a.

4. The method according to claim 1 wherein said mold is at a temperature of from about 30 to about 65° C., said mold is at substantially atmospheric pressure, said polymer is a polymer of ethylene and contains an effective foaming amount of azodicarbonamide, said mold is formed from aluminum and said mold is lined with polyethylene terephthalate.

References Cited

UNITED STATES PATENTS

| | | | |
|---|---|---|---|
| 3,007,203 | 11/1961 | Ammons | 264—54 X |
| 3,058,161 | 10/1962 | Beyer et al. | 264—47 |
| 3,211,605 | 10/1965 | Spaak et al. | 264—48 X |
| 3,218,375 | 11/1965 | Hardwick | 264—48 X |
| 3,384,691 | 5/1968 | Weissman et al. | 264—48 X |

PHILIP E. ANDERSON, Primary Examiner

U.S. Cl. X.R.

161—161; 264—54, 328